Patented Aug. 17, 1943

2,326,800

UNITED STATES PATENT OFFICE 2,326,800

PROCESS OF CARRYING OUT REACTIONS WITH CARBONACEOUS SUBSTANCES

Mathias Pier, Heidelberg, Wilhelm v. Fuener and Gerhard Free, Ludwigshafen-on-the-Rhine, Germany; vested in the Alien Property Custodian No Drawing. Application August 15, 1940, Serial No. 352,742. In Germany December 9, 1938

2 Claims. (Cl. 196—52)

The present invention relates to a process of carrying out reactions with carbonaceous substances.

We have found that reactions with carbonaceous substances carried through at a temperature above 300° C., especially the cracking by hydrocarbon oils or the destructive hydrogenation of coals, tars and mineral oils, can be carried out with very good results by using a catalyst prepared by introducing a solution of a silica gel forming substance and a solution of a metal salt into an ammoniacal liquid, separating the precipitate from the liquid, heating it and, if desired, adding another metal compound.

A solution of a silica gel forming substance may be obtained, for example, by so mixing a solution of waterglass with an acid that a clear sol results.

As the metal salt solution may be used aqueous solutions of salts of the metals of the 2nd to the 8th group of the periodic system, especially of aluminum, magnesium, zinc, tin, titanium, chromium, molybdenum, tungsten, vanadium, iron, cobalt or nickel.

The sol and the solution of the metal salt are then poured, preferably simultaneously, into an ammoniacal liquid, for example aqueous ammonia, or an aqueous solution of ammonium carbonate or ammonium sulphide. It is advantageous to maintain at least one of the solutions at an elevated temperature, for example the ammoniacal liquid. This latter liquid is preferably employed in so large an amount that the mixture remains alkaline after the precipitation. We prefer to make use of such catalysts as contain silicon and aluminum and/or magnesium (as compounds) and, if desired, also a small proportion of a compound of a metal of the iron group, for example iron oxide.

The precipitate which consists of the gel and the precipitated metal compound is separated from the liquid, washed and dried and heated slowly to high temperatures, as for example to 800° C.

The preparation of the catalysts may be carried out with an addition of bleaching earth or bauxite or similar substances.

The catalysts may also be shaped together with carbonaceous substances, as for instance graphite, brown coal low temperature coke, and then subjected to higher temperatures, as for example at from 500 to 800° C.

It may also be of advantage to dissolve one or more of the metal compounds contained in the catalysts out therefrom either completely or to a large extent, for example by means of inorganic or organic acids. The products obtained are then well washed out, dried and heated. The metal may also be dissolved out already from the moist gels before the latter have been heated to a high temperature.

It is also of advantage to incorporate with the catalysts a slight amount of boric acid, for example from 0.2 to 10 per cent, either before, during or after the heating.

The proportion of silica in the catalysts preferably amounts to from 10 to 95 per cent. Silica and alumina, when contained in the catalysts in addition to other constituents, may occur therein in other proportions than in natural bleaching earths; thus the contents of silica may range, for example, between 30 and about 70 or between about 80 and 96 per cent.

It is especially advantageous to provide the finished catalysts containing, for example, silicon and aluminum, with one or more heavy metal compounds, especially sulphides, as for example tungsten sulphide, molybdenum sulphide, nickel sulphide or iron sulphide.

The catalysts are preferably rigidly arranged in the reaction chamber.

With the said catalysts particularly good results are obtained in the destructive hydrogenation in the vapor phase of hydrocarbon oils to form low-boiling hydrocarbons, wherein it is advantageous to employ pressures of more than 250 atmospheres, for example of from 350 to 800 atmospheres or more, as for instance from 900 to 2000 atmospheres.

The catalysts are generally added in an amount of from 0.2 to 25 per cent. Also when working in the liquid phase the catalysts are highly suitable.

The following example serves to illustrate how the present invention may be carried out in practice, but the invention is not restricted to this example.

Example 160 cubic centimeters of concentrated hydrochloric acid and a solution of 345 grams of aluminum nitrate $Al(NO_3)_3.9H_2O$, 6 grams of ferric chloride $FeCl_3.6H_2O$ and 16 grams of magnesium nitrate $Mg(NO_3)_2.6H_2O$ in 2 liters of water are added to a mixture of 250 cubic centimeters of sodium silicate solution containing 32 grams of silica in 100 cubic centimeters with 3 liters of water. The resulting clear solution is slowly poured into 290 cubic centimeters of aqueous ammonia of 25 per cent strength while stirring. The resulting precipitate is filtered, washed with ammoniacal water until free from chlorine, dried and heated to 400° C. The product is ground and soaked with ammonium thiotungstate dissolved in ammonium sulphide so that the finished catalyst contains 10 per cent of tungsten sulphide, whereupon the thiotungstate is decomposed in a current of hydrogen at 400° C., and the product is moistened with water, shaped and dried.

On the other hand, a commercial active silica was slightly acidified and soaked with a solution of aluminum nitrate, ferric chloride and magnesium nitrate in the proportions above referred to, heated to 400° C. and then soaked with ammoium thiotungstate dissolved in ammonium sulphide and further treated as stated above; when used in the manner described above, this catalyst yields a product containing but 55 per cent of benzine having an octane number of 66 upon a single passage.

What we claim is:

1. A process for the production of gasoline from hydrocarbons boiling above the gasoline boiling range which comprises cracking said last-named hydrocarbons in the presence of a solid contact mass comprising silica and magnesia formed by introducing a solution containing a silical sol and a soluble magnesium salt into an ammoniacal solution to form a precipitate and thereafter washing and drying the resulting precipitate.

2. In the process defined by claim 1, the further improvement which comprises incorporating from .2 to 10% of boric acid into the resulting precipitated product.

MATHIAS PIER.
WILHELM v. FUENER.
GERHARD FREE.